(12) United States Patent
Murakami

(10) Patent No.: US 9,031,041 B2
(45) Date of Patent: May 12, 2015

(54) MOBILE COMMUNICATION METHOD AND BASE STATION

(75) Inventor: Keiji Murakami, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 110 days.

(21) Appl. No.: 13/982,234

(22) PCT Filed: Jan. 18, 2012

(86) PCT No.: PCT/JP2012/050923
§ 371 (c)(1),
(2), (4) Date: Jul. 26, 2013

(87) PCT Pub. No.: WO2012/102143
PCT Pub. Date: Aug. 2, 2012

(65) Prior Publication Data
US 2013/0315209 A1   Nov. 28, 2013

(30) Foreign Application Priority Data
Jan. 26, 2011   (JP) .................................. 2011-014586

(51) Int. Cl.
*H04Q 7/00*   (2006.01)
*H04W 28/06*   (2009.01)
*H04L 29/06*   (2006.01)
*H04W 36/00*   (2009.01)
*H04W 36/02*   (2009.01)

(52) U.S. Cl.
CPC ............ *H04W 28/065* (2013.01); *H04W 28/06* (2013.01); *H04L 69/04* (2013.01); *H04L 69/22* (2013.01); *H04W 36/0011* (2013.01); *H04W 36/023* (2013.01)

(58) Field of Classification Search
None
See application file for complete search history.

(56) References Cited

U.S. PATENT DOCUMENTS

| 7,290,063 B2 * | 10/2007 | Kalliokulju et al. .......... 709/247 |
| 2002/0097723 A1 * | 7/2002 | Tourunen et al. ............. 370/392 |
| 2004/0264433 A1 * | 12/2004 | Melpignano .................. 370/349 |
| 2010/0027497 A1 | 2/2010 | Pelletier | 
| 2010/0135249 A1 | 6/2010 | Meyer et al. |
| 2011/0134831 A1 * | 6/2011 | Pirskanen ..................... 370/328 |

FOREIGN PATENT DOCUMENTS

JP   2007-267287 A   10/2007
(Continued)

OTHER PUBLICATIONS

International Search Report; PCT/JP2012/050923; Feb. 14, 2012.
(Continued)

*Primary Examiner* — Duc C Ho
(74) *Attorney, Agent, or Firm* — Studebaker & Brackett PC

(57) ABSTRACT

A source base station eNB#1 forwards a header-compressed packet addressed to a radio terminal UE, to a target base station eNB#2, at a time of a handover procedure of the radio terminal from the source base station eNB#1 to the target base station eNB#2. Upon receipt of the forwarded header-compressed packet and a header-non-compressed packet addressed to the radio terminal UE from a core network EPC at the time of the handover procedure, the target base station eNB#2 generates an ROHC context corresponding to a header compression level of the header-compressed packet, by using the header-compressed packet and the header-non-compressed packet.

10 Claims, 12 Drawing Sheets

(56) References Cited

FOREIGN PATENT DOCUMENTS

| JP | 2008-244875 A | 10/2008 |
| JP | 2010-521872 A | 6/2010 |
| JP | 2010-525737 A | 7/2010 |
| WO | 2008/115116 A1 | 9/2008 |
| WO | 2008/133587 A1 | 11/2008 |

OTHER PUBLICATIONS

3GPP TS 36.3.. V10.1.0 (Sep. 2010); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10); pp. 1-192.

* cited by examiner

MOBILE COMMUNICATION METHOD AND BASE STATION

TECHNICAL FIELD

The present invention relates to a mobile communication method and a base station in a mobile communication system using a header compression technology.

BACKGROUND ART

In 3GPP (3rd Generation Partnership Project) which is a project aiming to standardize a mobile communication system, specifications of LTE (Long Term Evolution) and LTE Advanced, which is a sophisticated version of LTE, have been designed in order to perform higher speed communication with larger capacity.

In such a mobile communication system, in order to reduce a ratio of a header to a packet transmitted and received via a radio space, that is, an overhead, a ROHC (Robust Header Compression) protocol, which is one of the header compression technologies, is used (see Non Patent Literature 1). According to the ROHC protocol, it is possible to compress a packet header of various formats, such as IP (Internet Protocol), UDP (User Datagram Protocol), or RTP (Real-time Transport Protocol), up to 1 byte In the header compression technology, each of a radio terminal and a base station constructs header-related information on the basis of a packet to be transmitted and received, and perform header compression and decompression for the packet transmitted and received via a radio space by using the header-related information shared between the radio terminal and the base station. In such a header compression technology, as the header-related information is being constructed in the radio terminal and the base station, it is possible to sequentially increase a header compression level. The header-related information in the ROHC protocol is called ROHC context.

CITATION LIST

Non Patent Literature

[NPL 1] 3GPP TS 36.300 V10.1.0 (2010-09)

SUMMARY OF THE INVENTION

However, when a handover procedure of a radio terminal from a first base station (a source base station) to a second base station (a target base station) is performed, even though the header-related information has been constructed between the first base station and the radio terminal, it is necessary to construct again header-related information between the second base station and the radio terminal from the beginning.

Therefore, the mobile communication system using the header compression technology has a problem in that a header compression level is reduced for a moment after the handover procedure is completed, and an overhead increases.

Therefore, it is an object of the present invention to provide a mobile communication method with which it is possible to suppress an increase in an overhead after the handover procedure is completed in a mobile communication system using a header compression technology, and also to provide a base station.

In order to solve the aforementioned problem, the present invention has a following characteristic. Firstly, the characteristic of a mobile communication method is summarized as follows. A mobile communication method using a header compression technology, comprises: a step of forwarding, by a first base station (source base station eNB#1), to a second base station (target base station eNB#2), a header-compressed packet addressed to a radio terminal (radio terminal UE) at a time of a handover procedure of the radio terminal from the first base station to the second base station; a step of generating, by the second base station, upon receipt of the forwarded header-compressed packet and a header-non-compressed packet addressed to the radio terminal from a core network (core network EPC) at the time of the handover procedure, by using the header-compressed packet and the header-non-compressed packet, header-related information (ROHC context) corresponding to a header compression level of the header-compressed packet; and a step of performing, by the second base station, after the handover procedure is completed, by using the generated header-related information, header compression for the header-non-compressed packet received from the core network and addressed to the radio terminal, and transmitting, to the radio terminal, a header-compressed packet obtained through the header compression.

According to such a characteristic, at the time of the handover procedure, the second base station uses the header-compressed packet from the first base station and the header-non-compressed packet from the core network, and generates the header-related information corresponding to the header compression level of the header-compressed packet. After the handover procedure is completed, the second base station uses the header-related information generated at the time of the handover procedure, performs header compression for the header-non-compressed packet received from the core network, and transmits the header-compressed packet obtained through the header compression to the radio terminal.

In this way, for a downlink, it is possible to maintain the header compression level before and after the handover procedure, and to suppress an increase in an overhead after the handover procedure is completed.

Another characteristic of the mobile communication method is summarized as follows. In the mobile communication method according to the characteristic above, the step of generating the header-related information comprises: a step of designating a header compression level of the forwarded header-compressed packet; and a first acquisition step of acquiring, on the basis of the designated header compression level, each parameter of a packet header field that should be classified as a fixed value from one header-non-compressed packet received from the core network and addressed to the radio terminal, and the header-related information includes each of the parameters acquired in the first acquisition step.

Another characteristic of the mobile communication method is summarized as follows. In the mobile communication method according to the characteristic above, the step of generating the header-related information comprises: a second acquisition step of acquiring, on the basis of the designated header compression level, a value used for calculating each parameter of a packet header field that should be classified as a value having regularity by using a plurality of header-non-compressed packets received from the core network and addressed to the radio terminal, wherein the header-related information further includes the value acquired in the second acquisition step.

Another characteristic of the mobile communication method is summarized as follows. The mobile communication method according to the characteristic above further comprises: a step of transmitting information from the first base station to the radio terminal at the time of the handover procedure, the information being used for holding header-related information used by the radio terminal between the radio terminal and the first base station; a step of performing, by the radio terminal, the handover procedure while holding the header-related information used between the radio terminal and the first base station, when the radio terminal receives the information from the first base station; and a step of performing, by the radio terminal, header decompression for the header-compressed packet received from the second base station, by using the held header-related information after the handover procedure is completed.

A characteristic of a base station is summarized as follows. A base station (target base station eNB#2) in a mobile communication system (mobile communication system 1) using a header compression technology, comprises: a network communication unit (network communication unit 120#2) that communicates with another base station (source base station eNB#1) and a core network (core network EPC); a radio communication unit (radio communication unit 110#2) that communicates with a radio terminal (radio terminal UE); and a control unit (control unit 140#2) that controls the network communication unit and the radio communication unit, wherein the control unit performs control such that when the network communication unit receives a header-compressed packet addressed to the radio terminal from the other base station and a header-non-compressed packet addressed to the radio terminal from a core network, at a time of a handover procedure of the radio terminal from the other base station to the self base station, header-related information corresponding to a header compression level of the header-compressed packet is generated by using the header-compressed packet and the header-non-compressed packet, and after the handover procedure is completed, header compression is performed for the header-non-compressed packet received from the core network and addressed to the radio terminal by using the generated header-related information, and a header-compressed packet obtained through the header compression is transmitted from the radio communication unit to the radio terminal.

A characteristic of a mobile communication method is summarized as follows. A mobile communication method using a header compression technology, comprises: a step of forwarding, by a first base station (source base station eNB#1), to a second base station (target base station eNB#2), a header-non-compressed packet addressed from the radio terminal (radio terminal UE) to a core network (core network EPC), at a time of a handover procedure of a radio terminal from the first base station to the second base station; a step of generating, by the second base station, upon receipt of the forwarded header-non-compressed packet and a header-compressed packet from the radio terminal at the time of the handover procedure, by using the header-non-compressed packet and the header-compressed packet, header-related information corresponding to a header compression level of the header-compressed packet; and a step of performing, by the second base station, header decompression for the header-compressed packet received from the radio terminal by using the generated header-related information, and transmitting, to the core network, a header-non-compressed packet obtained through the header decompression after the handover procedure is completed.

According to such a characteristic, at the time of the handover procedure, the second base station uses the header-non-compressed packet from the first base station and the header-compressed packet from the radio terminal, and generates the header-related information corresponding to the header compression level of the header-compressed packet. After the handover procedure is completed, the second base station uses the header-related information generated in the handover procedure, performs header decompression for the header-compressed packet received from the radio terminal, and transmits, to the core network, a header-non-compressed packet obtained through the header decompression.

In this way, for an uplink, it is possible to maintain the header compression level before and after the handover procedure, and to suppress an increase in an overhead after the handover procedure is completed.

Another characteristic of the mobile communication method is summarized as follows. In the mobile communication method according to the characteristic above, the step of generating the header-related information comprises: a step of designating a header compression level of the header-compressed packet from the radio terminal; and a first acquisition step of acquiring, on the basis of the designated header compression level, each parameter of a packet header field that should be classified as a fixed value from one header-non-compressed packet forwarded from the first base station, the header-related information includes each of the parameters acquired in the first acquisition step.

Another characteristic of the mobile communication method is summarized as follows. In the mobile communication method according to the characteristic above, the step of generating the header-related information comprises: a second acquisition step of acquiring, on the basis of the designated header compression level, a value used for calculating each parameter of a packet header field that should be classified as a value having regularity by using a plurality of header-non-compressed packets forwarded from the first base station, the header-related information further includes the value acquired in the second acquisition step.

Another characteristic of the mobile communication method is summarized as follows. The mobile communication method according to the characteristic above further comprises: a step of transmitting information from the first base station to the radio terminal at the time of the handover procedure, the information being used for holding header-related information used by the radio terminal between the radio terminal and the first base station; a step of performing, by the radio terminal, the handover procedure while holding the header-related information used between the radio terminal and the first base station, when the radio terminal receives the information from the first base station; and a step of performing, by the radio terminal, header compression for a header-non-compressed packet to be transmitted to the second base station, by using the held header-related information, and transmitting a header-compressed packet obtained through the header compression to the second base station after the handover procedure is completed.

A characteristic of a radio base station is summarized as follows. A base station (target base station eNB#2) in a mobile communication system using a header compression technology, comprises: a network communication unit (network communication unit 120#2) that communicates with another base station (source base station eNB#1) and a core network (core network EPC); a radio communication unit (radio communication unit 110#2) that communicates with a radio terminal (radio terminal UE); and a control unit (control unit 140#2) that controls the network communication unit and the radio communication unit, wherein the control unit controls such that when the network communication unit receives, from the other base station, a header-non-compressed packet addressed from the radio terminal to a core network and the radio communication unit receives a header-compressed packet from the radio terminal, at a time of a handover procedure of the radio terminal from the other base station to the base station, header-related information corresponding to a header compression level of the header-compressed packet is generated by using the header-non-compressed packet and the header-compressed packet, and after the handover procedure is completed, header decompression is performed for the header-compressed packet received from the radio terminal by the radio communication unit by using the generated header-related information, and a header-non-compressed packet obtained through the header decompression is transmitted from the network communication unit to the core network.

DESCRIPTION OF THE EMBODIMENTS

Figure 1:
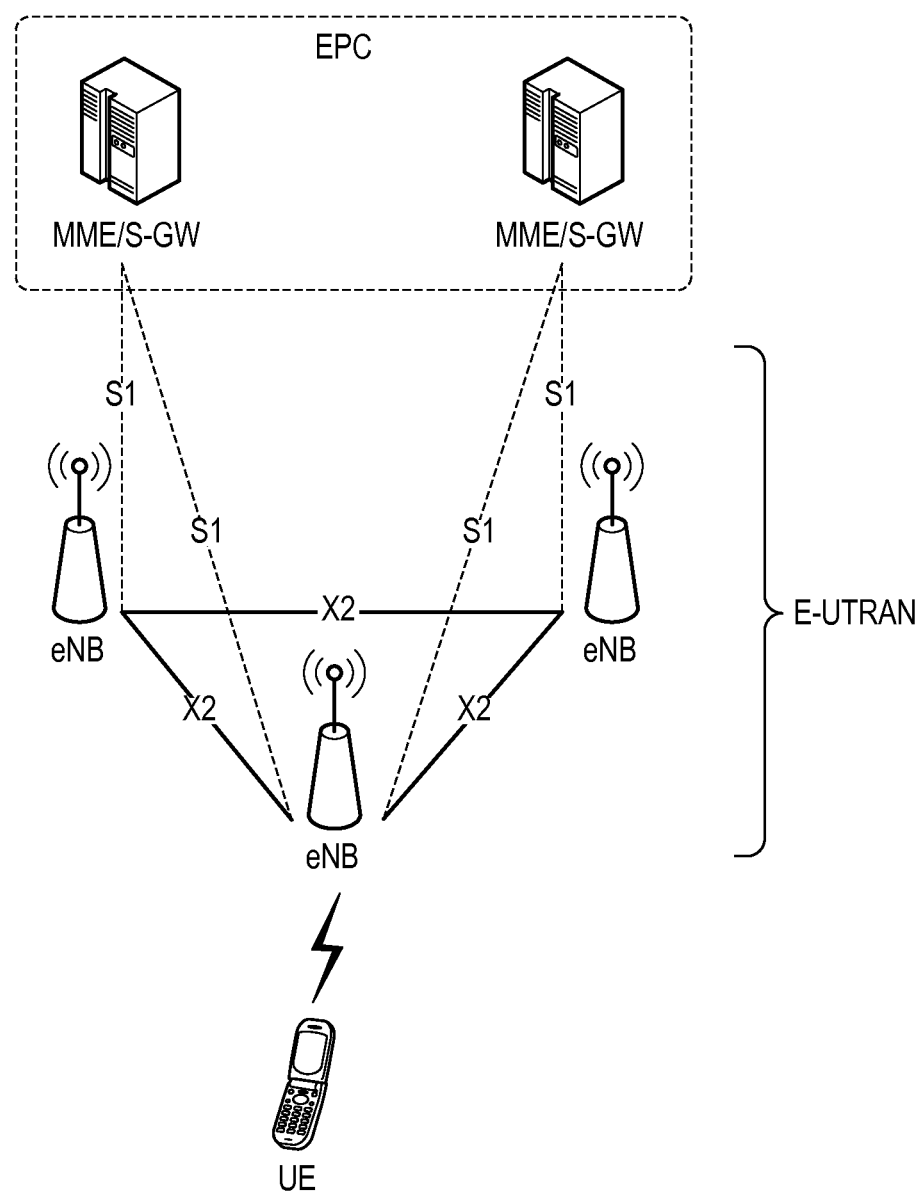
FIG. 1 is an entire schematic configuration diagram of a mobile communication system according to the embodiment of the present invention.

With reference to the drawings, the embodiments of the present invention will be described in the order of (1) Overview of mobile communication system, (2) Internal block configuration, (3) Overview of handover procedure, (4) ROHC context generation operation related to downlink, (5) ROHC context generation operation related to uplink, (6) Effect of embodiment, and (7) Other embodiments. In the drawings of the following embodiments, the same or similar reference signs are applied to the same or similar parts.

(1) Overview of Mobile Communication System

Firstly, the overview of a mobile communication system according to the present embodiment will be described in order of: (1.1) Schematic configuration of mobile communication system; and (1.2) Overview of ROHC protocol.

(1.1) Schematic Configuration of Mobile Communication System

FIG. 1 is an entire schematic configuration diagram of a mobile communication system 1 according to the present embodiment. The mobile communication system 1 is configured on the basis of LTE (Long Term Evolution), specifications of which have been designed in 3GPP.

As illustrated in FIG. 1, the mobile communication system 1 includes a radio terminal (UE: User Equipment), base stations (eNB: evolved Node-B), mobile management devices (MME: Mobility Management Entity), and gateway devices (S-GW: Serving Gateway).

A plurality of base stations eNB configure a radio access network (E-UTRAN: Evolved-UMTS Terrestrial Radio Access Network). A plurality of mobile management devices MME and a plurality of gateway devices S-GW configure a core network (EPC: Evolved Packet Core).

Each of the plurality of base stations eNB forms a communication area from which a service should be provided to the radio terminal UE. The communication area is configured by using one or a plurality of cells which are a minimum area unit.

The radio terminal UE is a radio communication device carried by a user, and is also called as "User Equipment". The radio terminal UE is able to perform, during communication, switching of serving base stations (or serving cells), that is, handover.

Hereinafter, in the handover, a base station serving as a switching source is called a source base station eNB#1 and a base station serving as a switching destination is called a target base station eNB#2. It is noted that LTE employs a hard handover, and at the time of the handover, data forwarding is performed from the source base station eNB#1 to the target base station eNB#2.

The base stations eNB adjacent to each other are able to communicate with each other by using an X2 interface which is a logical interface for inter-base station communication. The base stations eNB adjacent to each other transmit and receive, by using the X2 interface, a control signal used for packet management, handover control or the like.

The base station eNB is connected to the core network EPC. The base station eNB is able to communicate with the core network EPC, specifically, the mobile management device MME and the gateway device S-GW, by using an S1 interface which is a logical interface for communication with the core network EPC.

The mobile management device MME mainly executes a control plane function for enabling user authentication, paging, and a mutual connection with another system, for example. The mobile management device MME transmits and receives a control signal to and from the base station eNB by using an S1-MME interface which is a kind of the S1 interface.

The gateway device S-GW executes a user plane function for forwarding user data. The gateway device S-GW transmits and receives a data packet to and from the base station eNB by using an S1-U interface which is a kind of the S1 interface.

(1.2) Overview of ROHC Protocol

The ROHC protocol has been developed in RFC 3095, 3408, 3843, 4019, 4362, 4996, 5225 and the like for the purpose of comfortable transmission and reception of a continuous data stream such as voice communication or a video stream, and is separately defined as an IETF standardization technology. Furthermore, the ROHC protocol corresponds to various packet formats such as IP, UDP, or RTP, and is used for compressing a header part of each data packet.

Figure 2:
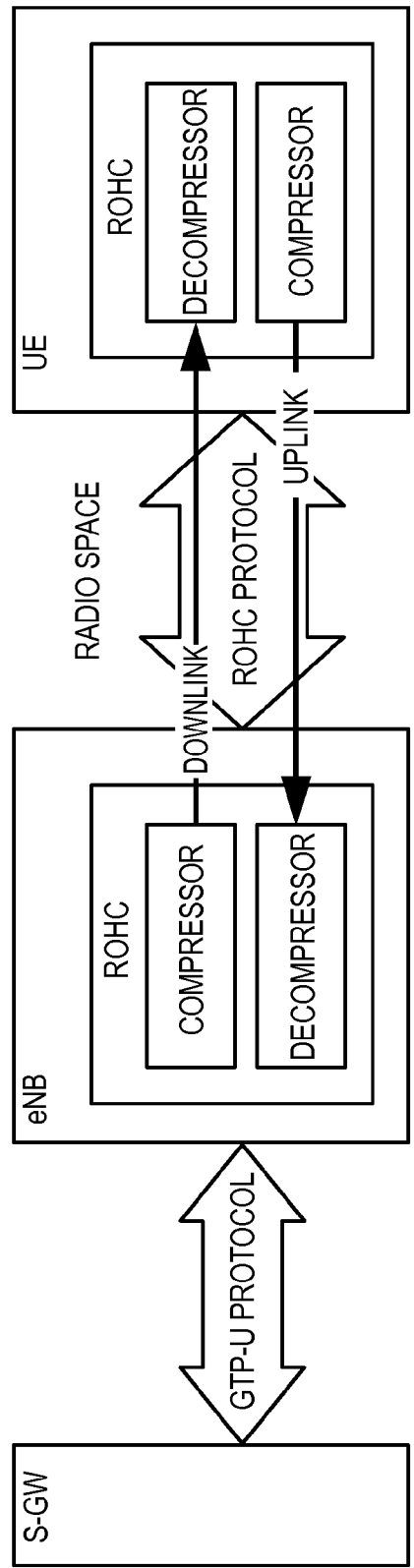
FIG. 2 is a diagram for explaining a ROHC compressor and a ROHC decompressor according to the embodiment of the present invention.

FIG. 2 is a diagram for explaining a ROHC compressor and a ROHC decompressor.

As illustrated in FIG. 2, in order to reduce a ratio of a header to a packet to be transmitted and received via a radio space, that is, an overhead, the radio terminal UE and the base station eNB transmit and receive a header-compressed packet by using the ROHC protocol (RFC 3095) for a downlink and an uplink, respectively. It is noted that the downlink indicates communication from the core network EPC toward the radio terminal UE, and the uplink indicates communication from the radio terminal UE toward the core network EPC.

The base station eNB has a ROHC compressor function for the downlink, and has a ROHC decompressor function for the uplink. The radio terminal UE has a ROHC decompressor function for the downlink, and has a ROHC compressor function for the uplink.

On the other hand, the base station eNB and the gateway device S-GW transmit and receive a header-non-compressed packet by using a GTP-U (GPRS Tunneling Protocol for User Plane) protocol which is a tunneling protocol.

Figure 3:
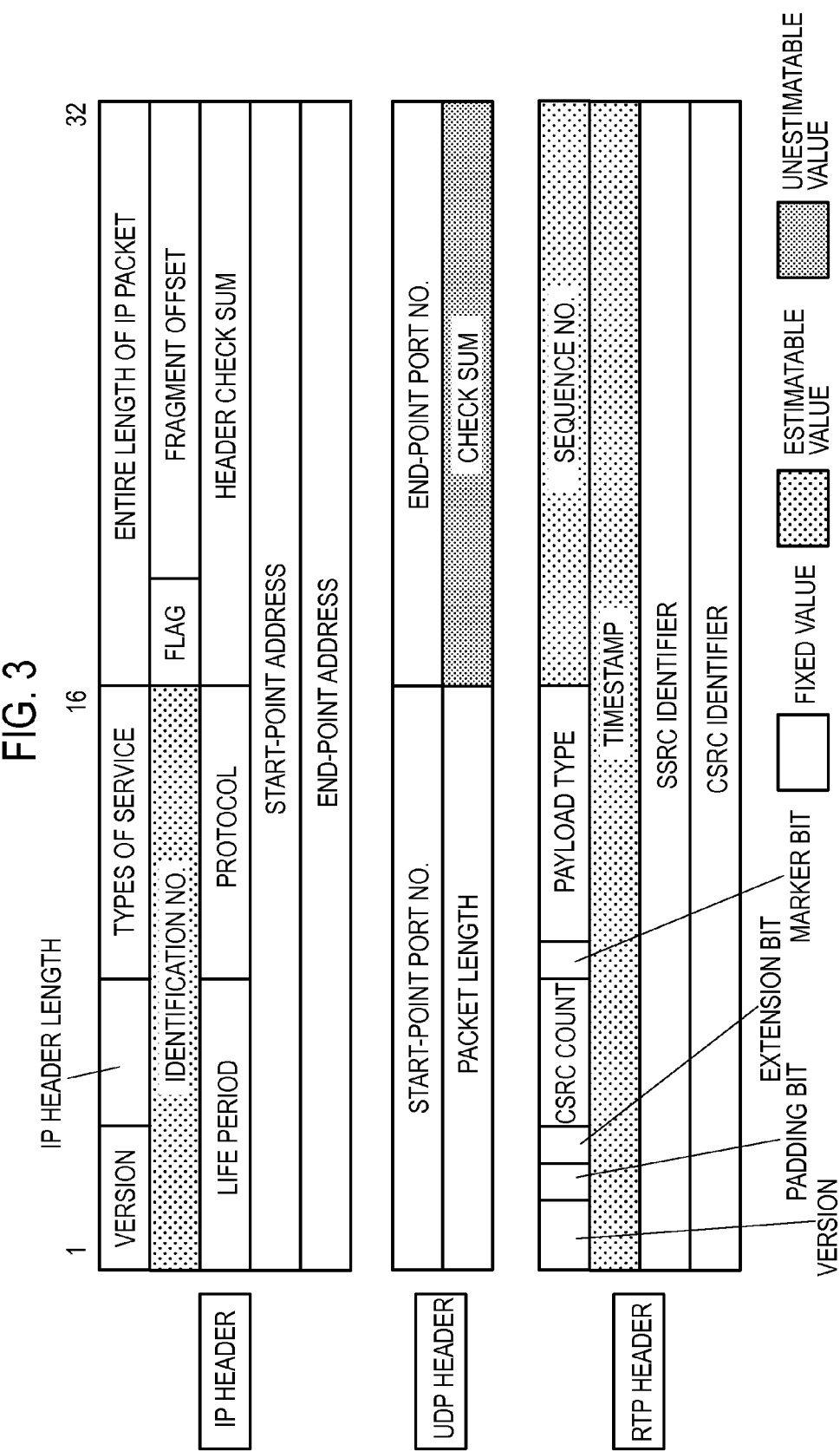
FIG. 3 is a diagram illustrating packet header fields of RTP/UDP/IP headers.

FIG. 3 is a diagram illustrating packet header fields of RTP/UDP/IP headers.

As illustrated in FIG. 3, in the ROHC protocol, by taking advantage of the consistency of RTP/UDP/IP headers between continuous packets, the ROHC compressor uses the ROHC context to omit the transmission of a fixed value and an estimatable value (that is, a value having regularity), and transmits information for calculating an estimatable value and information which is unestimatable and changes every time.

An example of the "fixed value" is an IP version. A parameter of a value that is classified into the "fixed value" is fixed during communication depending on each system, for example. Therefore, once communication starts, the value will not change. Therefore, ROHCs (UE and eNB) share this information as the ROHC context, so that omission (compression) of the "fixed value" is possible.

An example of the "value having regularity" is a timestamp. A value that is classified into the "value having regularity" has a characteristic that a parameter regularly changes depending on a protocol. To the timestamp, a parameter is assigned such that an arithmetic progression is formed for each packet, depending on a voice codec, for example. Therefore, when a parameter required for calculation, such as an initial value and an increment, can be shared as the ROHC context, it is possible to omit (compress) the "value having regularity".

An example of the "unestimatable value" is a UDP checksum. It is not possible to compress the "unestimatable value" by the ROHC and the "unestimatable value" indicates a field which cannot be compressed.

The ROHC compressor omits the transmission of the fixed value in a state where a compression level is low. The ROHC compressor omits the transmission of the estimatable value in addition to the fixed value in a state where the compression level is high. When the ROHC decompressor receives a ROHC packet in which a header is compressed (a header-compressed packet), the ROHC decompressor uses the ROHC context as to complement a value for which the transmission is omitted, and decompresses the header.

Figure 4:
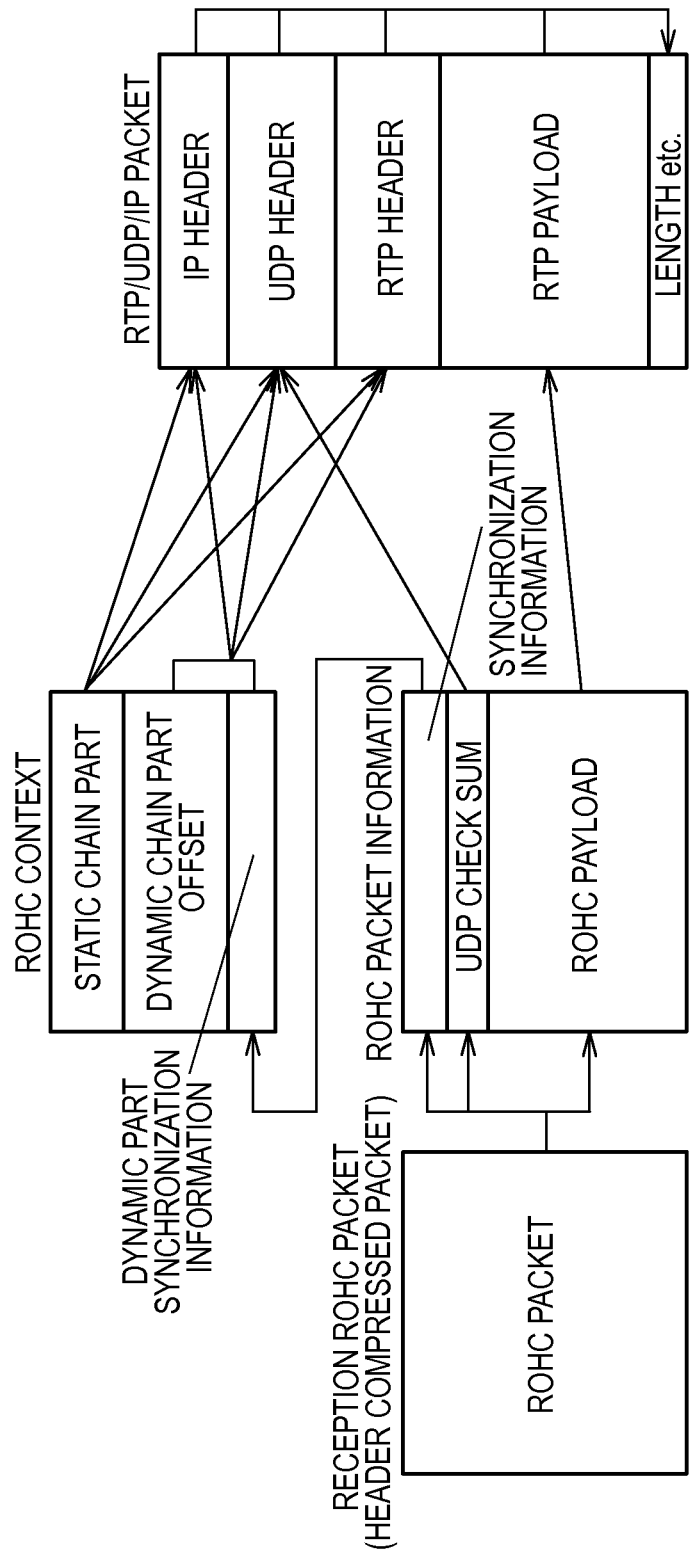
FIG. 4 is a diagram for explaining the ROHC context.

FIG. 4 is a diagram for explaining the ROHC context.

As illustrated in FIG. 4, the ROHC context includes a part (called a Static chain part) including each parameter of a packet header field that should be classified as the fixed value. In the state where the compression level is high, the ROHC context further includes a part (called a Dynamic chain part) formed of a value used for calculating each parameter of a packet header field that should be classified as the value having regularity. As the ROHC context is being constructed in each of the ROHC compressor and the ROHC decompressor, it is possible to sequentially increase the header compression level.

Figure 5:
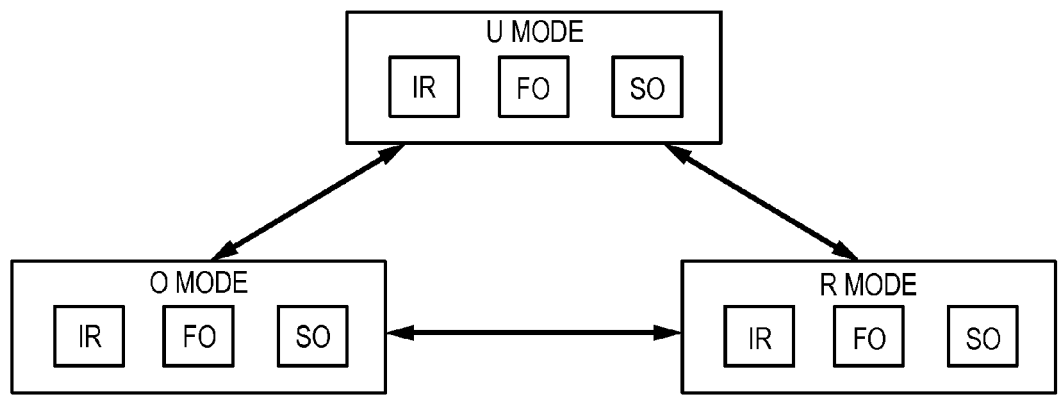
FIG. 5 is a diagram for explaining the header compression level defined in the ROHC protocol.

FIG. 5 is a diagram for explaining the header compression level defined in the ROHC protocol.

As illustrated in FIG. 5, in the ROHC protocol, three operation modes are prepared. Specifically, a unidirectional mode (hereinafter, a "U mode"), a bidirectional optimistic mode (hereinafter, an "O mode"), and a bidirectional high reliability mode (hereinafter, an "R mode") are prepared. The U mode is applied in a case where feedback information from the ROHC decompressor is not obtained, and the O mode and the R mode are applied in a case where the feedback information from the ROHC decompressor is obtained.

In each of the U mode, the O mode, and the R mode, three compression states (header compression levels) are defined. Specifically, an initialization/refresh state (an IR state), a first-order compression state (a FO state), and a second-order compression state (a SO state) are defined. The IR state is an initial state, and the ROHC compressor is transitioned to the IR state at the time of a recovery after an error, for example. In the IR state, a header is not compressed, and a packet (so called an IR packet) including a complete header is transmitted. The FO state is a state where a header is partially compressed and the header compression level is lower than the SO state. The SO state is a state where the header compression level is the highest. In the SO state, only an RTP sequence number is transmitted. It is noted that in each of the IR state, the FO state, and the SO state, multi-stage header compression levels are defined.

As the ROHC context is being constructed, the state is sequentially transitioned from the IR state to the FO state, and from the FO state to the SO state. However, when a handover procedure of the radio terminal UE from the source base station eNB#1 to the target base station eNB#2 is performed, since it is necessary to construct again the ROHC context between the target base station eNB#2 and the radio terminal UE from the beginning, and thus, even though the radio terminal UE operates in the FO state or the SO state before the handover, the radio terminal UE is initialized to the IR state after the handover, resulting in an increase in an overhead.

Therefore, in the present embodiment, the target base station eNB#2 generates the ROHC context in the course of the handover procedure. Therefore, it is possible to achieve, after the handover, the same compression state (header compression level) as that before the handover.

(2) Internal Block Configuration

Next, the internal block configuration of the mobile communication system 1 will be described in the order of (2.1) Configuration of base station and (2.2) Configuration of radio terminal.

(2.1) Configuration of Base Station

Figure 6:
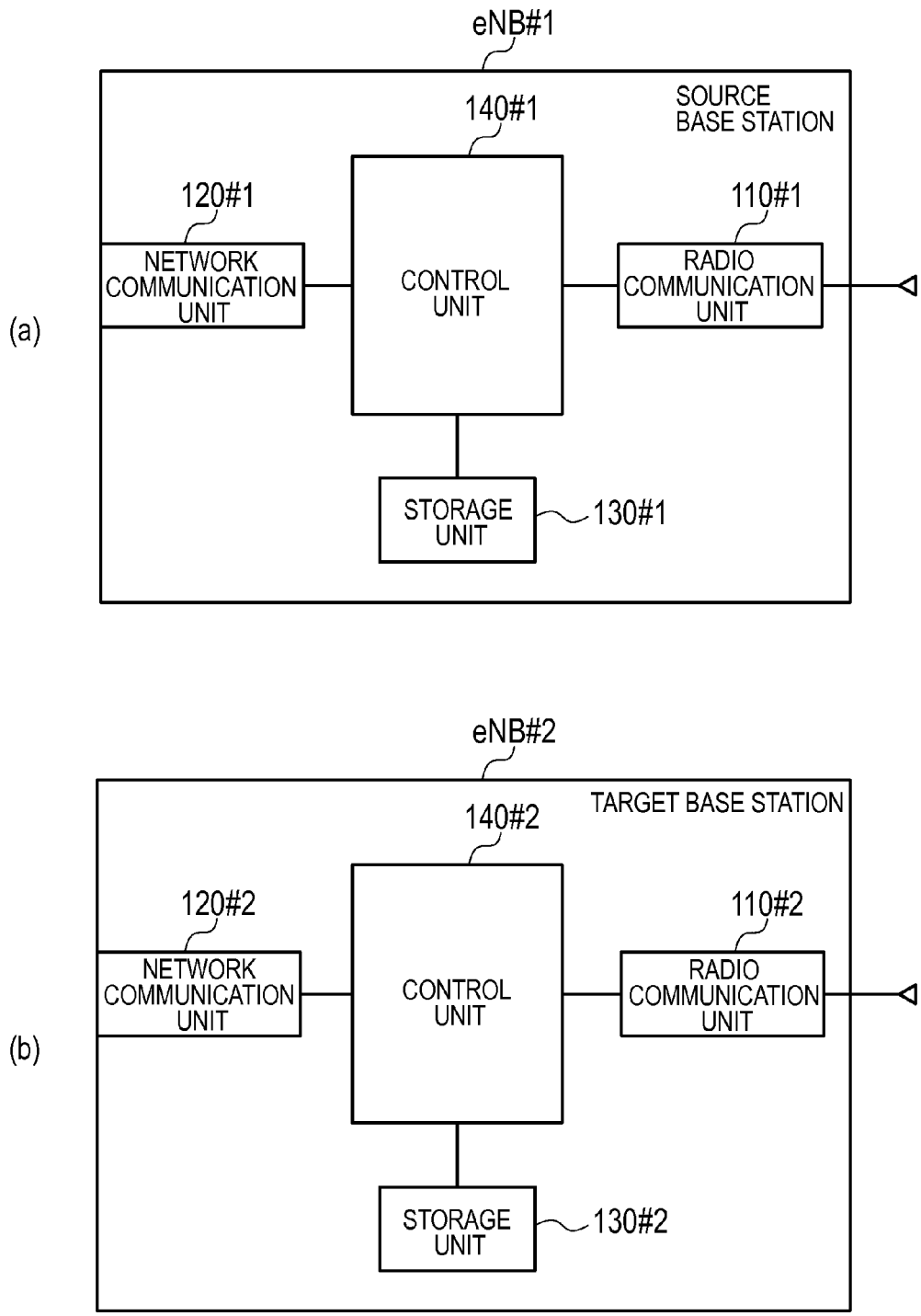
FIG. 6(a) is a block diagram illustrating the configuration of the source base station according to the embodiment of the present invention.
FIG. 6(b) is a block diagram illustrating the configuration of the target base station eNB#2 according to the embodiment of the present invention.

FIG. 6(*a*) is a block diagram illustrating the configuration of the source base station eNB#1. As illustrated in FIG. 6(*a*), the source base station eNB#1 includes a radio communication unit 110#1, a network communication unit 120#1, a storage unit 130#1, and a control unit 140#1.

The radio communication unit 110#1 is configured to perform radio communication via an antenna. For transmission, the radio communication unit 110#1, for example, upconverts and amplifies a baseband signal input from the control unit 140#1, and outputs a radio signal from the antenna. For reception, the radio communication unit 110#1, for example, amplifies and downconverts a reception signal input from the antenna, and then, outputs a baseband signal to the control unit 140#1.

The network communication unit 120#1 communicates with the core network EPC and the target base station eNB#2. Specifically, the network communication unit 120#1 communicates with the gateway device S-GW and the mobile management device MME by using an S1 interface. Furthermore, the network communication unit 120#1 performs inter-base station communication with the target base station eNB#2 by using an X2 interface.

The storage unit 130#1 is configured by using, for example, a memory, and stores various types of information used for control or the like of the control unit 140#1 and is also used as a buffer. Furthermore, the storage unit 130#1 stores the ROHC context. The control unit 140#1 is configured by using, for example, a CPU, and controls various functions (the radio communication unit 110#1 and the network communication unit 120#1, for example) of the source base station eNB#1. The control unit 140#1 functions as a ROHC compressor for the downlink while functioning as a ROHC decompressor for the uplink.

FIG. 6(b) is a block diagram illustrating the configuration of the target base station eNB#2. As illustrated in FIG. 6(b), the target base station eNB#2 includes a radio communication unit 110#2, a network communication unit 120#2, a storage unit 130#2, and a control unit 140#2.

The radio communication unit 110#2 is configured to perform radio communication via an antenna. For transmission, the radio communication unit 110#2, for example, upconverts and amplifies a baseband signal input from the control unit 140#2, and outputs a radio signal from the antenna. For reception, the radio communication unit 110#2, for example, amplifies and downconverts a reception signal input from the antenna, and then, outputs a baseband signal to the control unit 140#2.

The network communication unit 120#2 communicates with the core network EPC and the source base station eNB#1. Specifically, the network communication unit 120#2 communicates with the gateway device S-GW and the mobile management device MME by using the S1 interface. Furthermore, the network communication unit 120#2 performs inter-base station communication with the source base station eNB#1 by using the X2 interface.

The storage unit 130#2 is configured by using, for example, a memory, and stores various types of information used in control or the like of the control unit 140#2 and is also used as a buffer. Furthermore, the storage unit 130#2 stores the ROHC context. The control unit 140#2 is configured by using, for example, a CPU, and controls various functions (the radio communication unit 110#2 and the network communication unit 120#2, for example) of the source base station eNB#2. The control unit 140#2 functions as a ROHC compressor for the downlink while functioning as a ROHC decompressor for the uplink.

(2.2) Configuration of Radio Terminal

Figure 7:
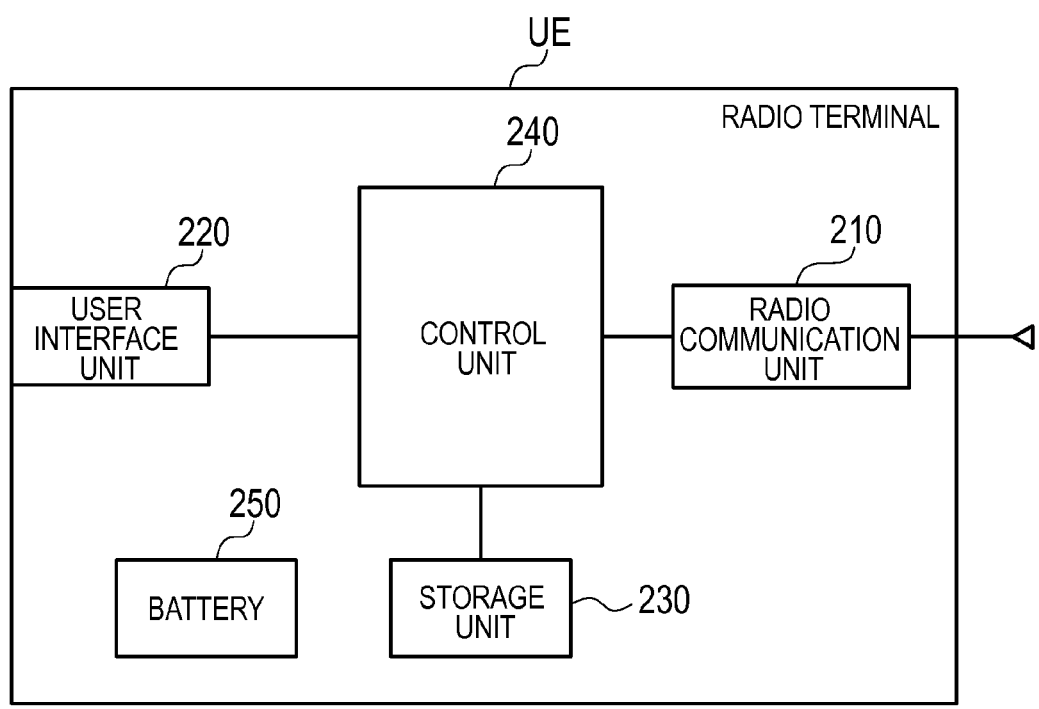
FIG. 7 is a block diagram illustrating the configuration of the radio terminal according to the embodiment of the present invention.

FIG. 7 is a block diagram illustrating the configuration of the radio terminal UE. As illustrated in FIG. 7, the radio terminal UE includes a radio communication unit 210, a user interface unit 220, a storage unit 230, a control unit 240, and a battery 250.

The radio communication unit 210 is configured to perform radio communication with the base station eNB via an antenna. For transmission, the radio communication unit 210, for example, upconverts and amplifies a baseband signal input from the control unit 240, and outputs a radio signal from the antenna. For reception, the radio communication unit 210, for example, amplifies and downconverts a reception signal input from the antenna, and then, outputs a baseband signal to the control unit 240. The user interface unit 220 is a display, button, or the like that functions as an interface with the user.

The storage unit 230 is configured by using, for example, a memory, and stores various types of information used in control or the like of the radio terminal UE. The storage unit 230 stores the ROHC context. The control unit 240 is configured by using, for example, a CPU, and controls various functions (the radio communication unit 210 and the user interface unit 220, for example) of the radio terminal UE. The control unit 240 functions as a ROHC decompressor for the downlink while functioning as a ROHC compressor for the uplink. The battery 250 accumulates power to be supplied to each block of the radio terminal UE.

(3) Overview of Handover Procedure

Next, the overview of the handover procedure according to the present embodiment will be described. Hereinafter, a description will be provided for a case where the radio terminal UE that is executing ROHC communication performs handover from the source base station eNB#1 to the target base station eNB#2.

Figure 8:
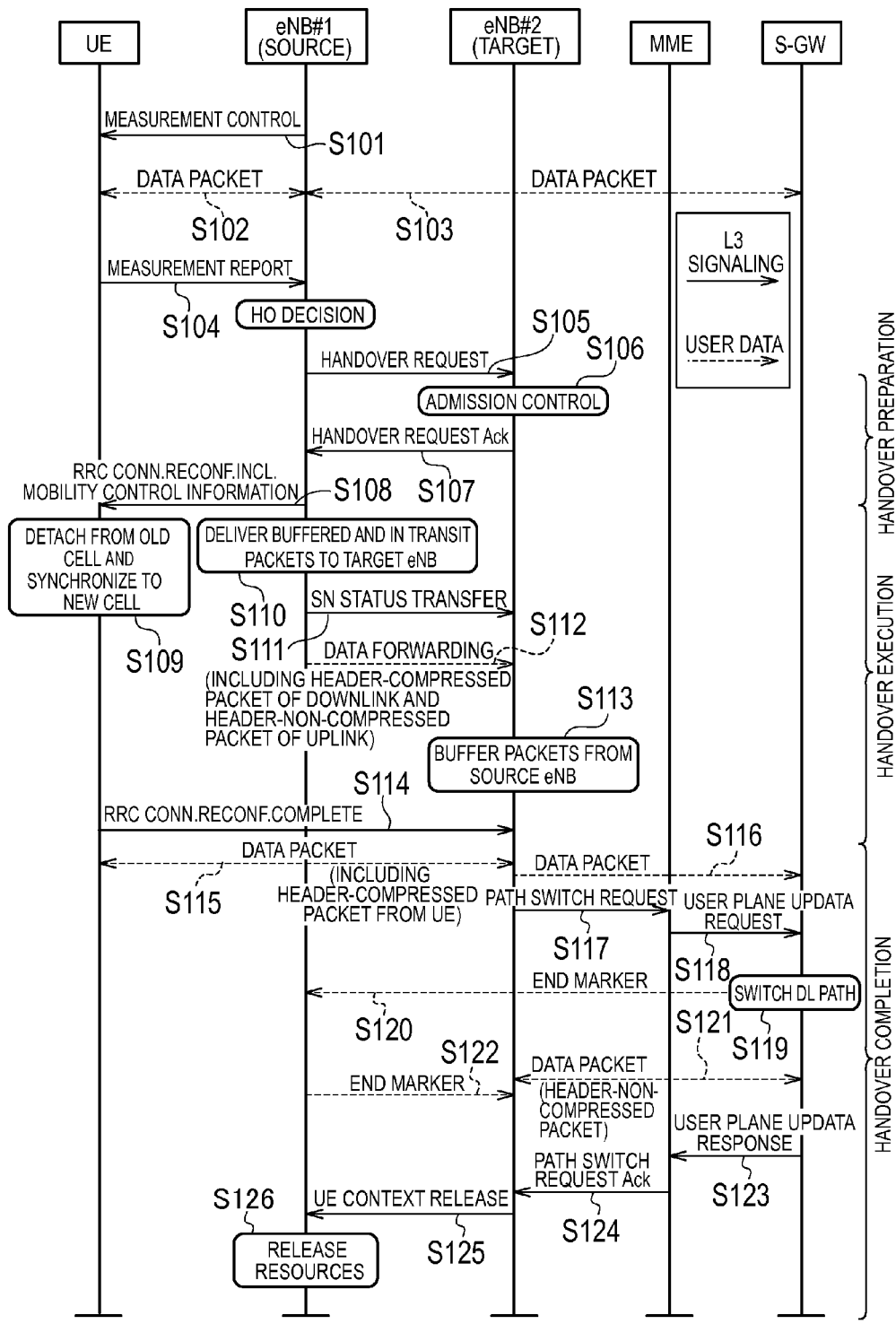
FIG. 8 is a sequence diagram for explaining the overview of the handover procedure according to the embodiment of the present invention.

FIG. 8 is a sequence diagram for explaining the overview of the handover procedure according to the present embodiment. FIG. 8 omits the illustration of some sequences of signaling or the like of lower layers (layer 1 and layer 2). The handover procedure includes a handover preparation stage, a handover execution stage, and a handover completion stage.

As illustrated in FIG. 8, in step S101, the source base station eNB#1 instructs the radio terminal UE to perform measurement regarding the downlink.

In step S102, the radio terminal UE and the source base station eNB#1 transmit and receive a header-compressed packet via a radio space, and in step S103, the source base station eNB#1 and the gateway device S-GW transmit and receive a header-non-compressed packet via a backhaul.

In step S103, the radio terminal UE transmits a report message of a measurement result to the source base station eNB#1. In step S104, the source base station eNB#1 determines whether to start the handover procedure on the basis of the report from the radio terminal UE. In this case, it is assumed that the source base station eNB#1 determines to start the handover procedure.

In step S105, the source base station eNB#1 transmits, to the target base station eNB#2, a handover request message including information for allowing the target base station eNB#2 to prepare the handover. In step S106, the target base station eNB#2 determines whether to permit accepting the radio terminal UE in response to the handover request message. In this case, it is assumed that the source base station eNB#1 determines to permit accepting the radio terminal UE. In step S107, the target base station eNB#2 transmits, to the source base station eNB#1, a handover positive response message including information for allowing the radio terminal UE to connect to the target base station eNB#2.

It is noted that each of the processes in step S105 to step S107 corresponds to the handover preparation stage of the handover procedure.

In step S108, the source base station eNB#1 notifies the radio terminal UE of the information for allowing the radio terminal UE to connect to the target base station eNB#2, and instructs the radio terminal UE to perform handover to the target base station eNB#2.

In step S109, the radio terminal UE disconnects from the source base station eNB#1, and starts synchronization with the target base station eNB#2. Even though the radio terminal UE disconnects from the source base station eNB#1, the radio terminal UE holds, without discarding, the ROHC context used between the radio terminal UE and the source base station eNB#1.

In step S110, the source base station eNB#1 determines to start forwarding data packets, which are held in a buffer and not transmitted yet, for both the downlink and the uplink. In step S111, the source base station eNB#1 transmits, to the target base station eNB#2, an SN Status Transfer message indicating the status of data packet transmission and reception to and from the radio terminal UE. In step S112, the source base station eNB#1 forwards, to the target base station eNB#2, the data packets, which are held in the buffer and not transmitted yet, of both the downlink and the uplink.

Furthermore, for the downlink, the source base station eNB#1 performs header compression for a data packet to be forwarded by using the ROHC context, and forwards, to the target base station eNB#2, the header-compressed packet obtained through the header compression. Meanwhile, for the uplink, the source base station eNB#1 forwards the data packet to be forwarded, to the target base station eNB#2 as it is. That is, for the uplink, the source base station eNB#1 forwards a header-non-compressed packet (a data packet having a non-compressed header).

In step S113, the target base station eNB#2 receives the header-compressed packet of the downlink forwarded from the source base station eNB#1, and the header-non-compressed packet of the uplink forwarded from the source base station eNB#1, and holds the header-compressed packet of the downlink and the header-non-compressed packet of the uplink.

In step S114, when succeeding in connecting to the target base station eNB#2, the radio terminal UE transmits a message indicating connection success to the target base station eNB#2.

It is noted that the processes in step S108 to step S114 each correspond to the handover execution stage of the handover procedure.

In step S115, the target base station eNB#2 transmits the header-compressed packet of the downlink held in step S113 to the radio terminal UE. The radio terminal UE performs header decompression for the received header-compressed packet of the downlink by using the held ROHC context. Furthermore, the radio terminal UE transmits a header-compressed packet, obtained by using the held ROHC context, to the target base station eNB#2.

The target base station eNB#2 generates a ROHC context for the uplink by using the header-non-compressed packet of the uplink forwarded from the source base station eNB#1 in step S112, and the header-compressed packet of the uplink transmitted from the radio terminal UE in step S115. The generation process will be described in detail later.

In step S116, the target base station eNB#2 transmits the data packet received from the radio terminal UE in step S115, to the gateway device S-GW.

In step S117, the target base station eNB#2 transmits a path switching request message in accordance with handover, to the mobile management device MME. In step S118, the mobile management device MME transmits an update request message for a user plane to the gateway device S-GW, in response to the received request message. In step S119, the gateway device S-GW switches a downlink path from the source base station eNB#1 to the target base station eNB#2, in response to the received request message. In step S120, the gateway device S-GW transmits an End Marker for notifying the path switching, to the source base station eNB#1.

In step S121, the target base station eNB#2 and the gateway device S-GW transmit and receive the header-non-compressed packet via the backhaul.

The target base station eNB#2 generates a ROHC context for the downlink by using the header-compressed packet of the downlink forwarded from the source base station eNB#1 in step S112, and the header-non-compressed packet of the downlink transmitted from the gateway device S-GW in step S121. The generation process will be described in detail later.

In step S122, the source base station eNB#1 transmits an End Marker indicating forwarding completion, to the target base station eNB#2.

In step S123, the gateway device S-GW transmits a response message indicating update completion of the user plane, to the mobile management device MME. In step S124, the mobile management device MME transmits, to the target base station eNB#2, a response message for the path switching request message from the target base station eNB#2. In step S125, the target base station eNB#2 transmits a message for notifying handover success, to the source base station eNB#1. In step S126, the source base station eNB#1 releases its own resource for the radio terminal UE.

In addition, each of the processes in step S115 to step S126 corresponds to the handover completion stage of the handover procedure.

In the course of such a handover procedure, the target base station eNB#2 generates the ROHC contexts for both the downlink and the uplink. Furthermore, the radio terminal UE performs the handover procedure while holding the ROHC contexts for both the downlink and the uplink.

Thus, the target base station eNB#2 and the radio terminal UE are, at the time point at which the handover procedure has been completed, in a state where it is possible to start ROHC communication at the same header compression level as that before the start of the handover procedure. Consequently, simultaneously with the start of communication of the target base station eNB#2 and the radio terminal UE after the handover procedure is completed, ROHC communication at a high header compression level is started.

(4) ROHC Context Generation Operation Related to Downlink

Next, the operation of the mobile communication system 1 related to the downlink will be described in the order of (4.1) General operation related to downlink, (4.2) Detailed operation example of source base station related to downlink, and (4.3) Detailed operation example of target base station related to downlink.

(4.1) General Operation Related to Downlink

Figure 9:
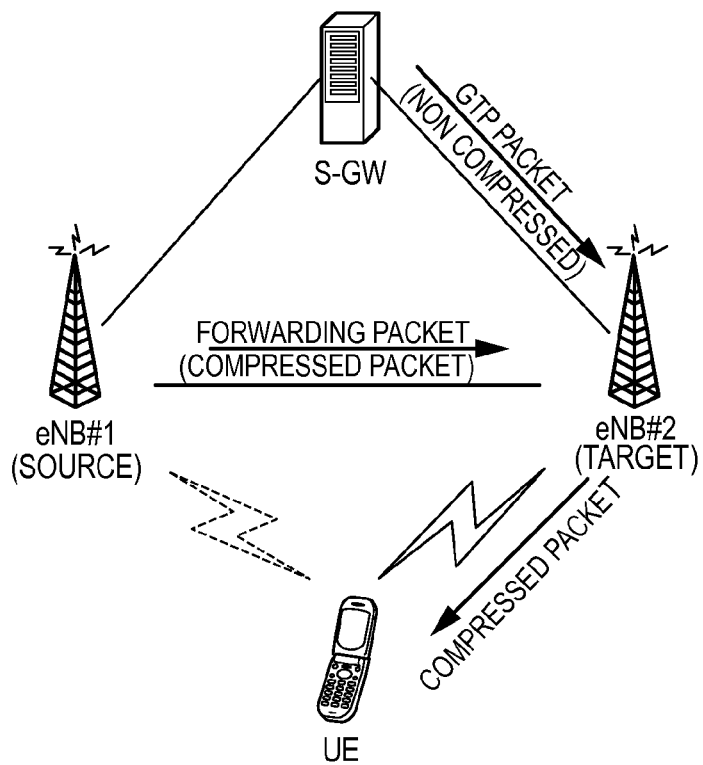
FIG. 9 is a diagram for explaining the overview of the ROHC context generation operation related to the downlink according to the embodiment of the present invention.

FIG. 9 is a diagram for explaining the overview of the ROHC context generation operation related to the downlink.

As illustrated in FIG. 9, firstly, at the time of the handover procedure of the radio terminal UE from the base station eNB#1 to the base station eNB#2, the control unit 140#1 of the base station eNB#1 controls the network communication unit 120#1 so that a header-compressed packet addressed to the radio terminal UE is forwarded to the base station eNB#2. When the network communication unit 120#2 receives the forwarded header-compressed packet, the control unit 140#2 performs control so that the header-compressed packet is stored in the base station eNB#2.

Secondly, the gateway device S-GW transmits, to the base station eNB#2, a header-non-compressed packet addressed to the radio terminal UE. When the network communication unit 120#2 receives the header-non-compressed packet from the gateway device S-GW, the control unit 140#2 of the base station eNB#2 generates a ROHC context corresponding to a header compression level of the header-compressed packet by using the forwarded header-compressed packet and the header-non-compressed packet from the gateway device S-GW. The control unit 140#2 of the base station eNB#2 so that the storage unit 130#2 stores the generated ROHC context.

Thirdly, after the handover procedure is completed, when the network communication unit 120#2 receives the header-non-compressed packet from the gateway device S-GW, the control unit 140#2 of the base station eNB#2 performs header compression for the header-non-compressed packet from the gateway device S-GW by using the generated ROHC context. Then, the control unit 140#2 of the base station eNB#2 controls the radio communication unit 110#2 to transmit the header-compressed packet obtained through the header compression to the radio terminal UE.

(4.2) Detailed Operation Example of Source Base Station Related to Downlink

Figure 10:
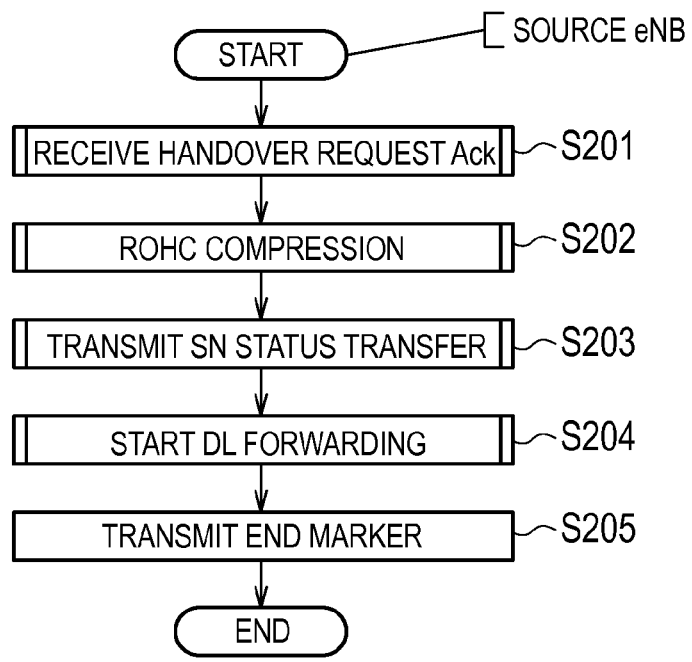
FIG. 10 is a flowchart illustrating the operation of the source base station related to the downlink according to the embodiment of the present invention.

FIG. 10 is a flowchart illustrating the operation of the source base station eNB#1 related to the downlink.

As illustrated in FIG. 10, in step S201, the network communication unit 120#1 of the base station eNB#1 receives a Handover Request Ack message (refer to step S107 in FIG. 8) from the target base station eNB#2.

In step S202, the control unit 140#1 of the base station eNB#1 performs header compression for a non-transmitted data packet of the downlink, which is buffered in the storage unit 130#1, by using the ROHC context.

In step S203, the control unit 140#1 of the base station eNB#1 controls the network communication unit 120#1 to transmit an SN Status transfer message (refer to step S111 in FIG. 8) to the target base station eNB#2.

In step S204, the control unit 140#1 of the base station eNB#1 controls the network communication unit 120#1 to forward a header-compressed packet obtained in step S202 (refer to step S112 in FIG. 8), to the target base station eNB#2.

In step S205, when the forwarding is completed, the control unit 140#1 of the base station eNB#1 controls the network communication unit 120#1 to transmit an End Marker (refer to step S122 in FIG. 8) indicating the completion of the forwarding, to the target base station eNB#2.

(4.3) Detailed Operation Example of Target Base Station Related to Downlink

Figure 11:
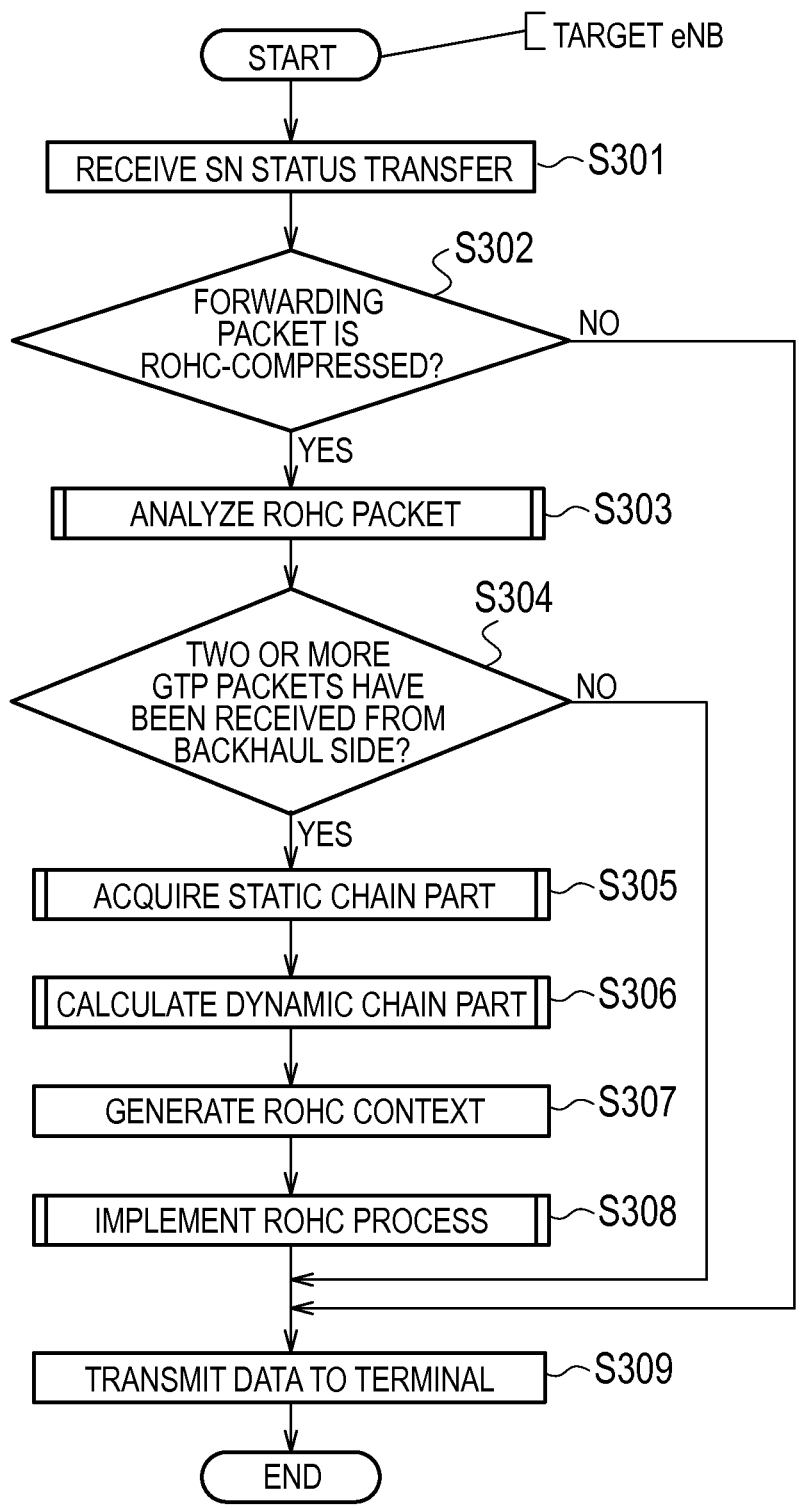
FIG. 11 is a flowchart illustrating the operation of the target base station related to the downlink according to the embodiment of the present invention.

FIG. 11 is a flowchart illustrating the operation of the target base station eNB#2 related to the downlink.

As illustrated in FIG. 11, in step S301, the network communication unit 120#2 of the base station eNB#2 receives the SN Status transfer message (refer to step S111 in FIG. 8) from the source base station eNB#1. Then, the network communication unit 120#2 of the base station eNB#2 starts receiving a forwarding packet. Furthermore, the network communication unit 120#2 of the base station eNB#2 starts receiving the header-non-compressed packet from the gateway device S-GW.

In step S302, the control unit 140#2 of the base station eNB#2 confirms whether the forwarding packet received in the network communication unit 120#2 is ROHC-compressed.

When the forwarding packet is not ROHC-compressed (step S302: NO), the control unit 140#2 of the base station eNB#2 controls the radio communication unit 110#2 to transmit the forwarding packet (a header-non-compressed packet) to the radio terminal UE (step S309).

Meanwhile, when the forwarding packet is ROHC-compressed (step S302: YES), the control unit 140#2 of the base station eNB#2 proceeds to a process in step S303.

In step S303, the control unit 140#2 of the base station eNB#2 analyzes a header-compressed packet that acts as the forwarding packet so as to designate the header compression level of the header-compressed packet. For example, by performing matching with a header-compression pattern (a header-omission pattern) for each header compression level stored in advance in the storage unit 130#2 of the base station eNB#2, the header compression level of the header-compressed packet that acts as the forwarding packet is designated. Alternatively, a difference between the header-compressed packet that acts as the forwarding packet and the header-non-compressed packet from the gateway device S-GW is evaluated, and on the basis of the difference, the header compression level of the header-compressed packet that acts as the forwarding packet may be designated.

In step S304, the control unit 140#2 of the base station eNB#2 confirms whether the network communication unit 120#2 has received two or more header-non-compressed packets (GTP packets) from the gateway device S-GW. It is noted that in order to calculate the Dynamic chain part, a plurality of header-non-compressed packets are required.

When the network communication unit 120#2 has not received the two or more header-non-compressed packets from the gateway device S-GW (step S304: NO), the control unit 140#2 of the base station eNB#2 controls the radio communication unit 110#2 to transmit the forwarding packet (the header-non-compressed packet) to the radio terminal UE (step S309).

Meanwhile, when the network communication unit 120#2 receives the two or more header-non-compressed packets from the gateway device S-GW (step S304: YES), the control unit 140#2 of the base station eNB#2 proceeds to a process in step S305.

In step S305, the control unit 140#2 of the base station eNB#2 acquires each parameter (Static chain) of a packet header field that should be classified as the fixed value from one header-non-compressed packet received from the gateway device S-GW, on the basis of the header compression level designated in step S303. Step S305 corresponds to a first acquisition step. The acquired Static chain configures at least a part of the ROHC context.

In step S306, on the basis of the header compression level designated in step S303, the control unit 140#2 of the base station eNB#2 acquires a value (Dynamic chain) used for calculating each parameter of the packet header field that should be classified as the value having regularity, by using a plurality of header-non-compressed packets that have been received from the gateway device S-GW and are addressed to the radio terminal UE. Step S306 corresponds to a second acquisition step. The acquired Dynamic chain configures a part of the ROHC context. Furthermore, when the header compression level designated in step S303 is low, step S306 may be omitted. Furthermore, at this time, it is preferable that the compression level is coincided with that of the forwarded header-compressed packet.

When the ROHC context is generated in this way (step S307), the control unit 140#2 of the base station eNB#2 controls the storage unit 130#2 to store the generated ROHC context.

In step S308, the control unit 140#2 of the base station eNB#2 performs header compression for the header-non-compressed packet, which has been received, by the network communication unit 120#2, from the gateway device S-GW, by using the stored ROHC context.

In step S309, the control unit 140#2 of the base station eNB#2 controls the radio communication unit 110#2 to transmit the header-compressed packet obtained in step S308, to the radio terminal UE.

(5) ROHC Context Generation Operation Related to Uplink

Next, the operation of the mobile communication system 1 related to the uplink will be described in the order of (5.1) General operation related to uplink, (5.2) Detailed operation example of source base station related to uplink, and (5.3) Detailed operation example of target base station related to uplink.

(5.1) General Operation Related to Uplink

Figure 12:
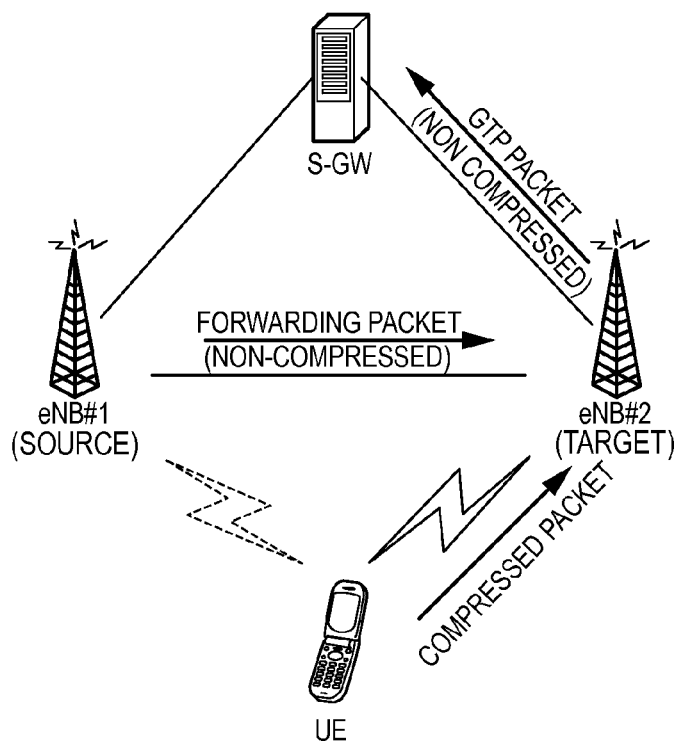
FIG. 12 is a diagram for explaining the overview of the ROHC context generation operation related to the uplink according to the embodiment of the present invention.

FIG. 12 is a diagram for explaining the overview of the ROHC context generation operation related to the uplink.

As illustrated in FIG. 12, firstly, at the time of the handover procedure of the radio terminal UE from the base station eNB#1 to the base station eNB#2, the control unit 140#1 of the base station eNB#1 controls the network communication unit 120#1 to forward a header-non-compressed packet addressed to the gateway device S-GW from the radio terminal UE, to the base station eNB#2. When the network communication unit 120#2 receives the forwarded header-non-compressed packet, the control unit 140#2 of the base station eNB#2 controls the storage unit 130#2 to store the header-non-compressed packet.

Secondly, the radio terminal UE transmits a header-compressed packet addressed to the gateway device S-GW, to the base station eNB#2. When the network communication unit 120#2 receives the header-compressed packet from the radio terminal UE, the control unit 140#2 of the base station eNB#2 generates a ROHC context corresponding to a header compression level of the header-compressed packet by using the forwarded header-non-compressed packet and the header-compressed packet from the radio terminal UE. The control unit 140#2 of the base station eNB#2 controls the storage unit 130#2 to store the generated ROHC context.

Thirdly, after the handover procedure is completed, when the radio communication unit 110#2 receives the header-compressed packet from the radio terminal UE, the control unit 140#2 of the base station eNB#2 performs header decompression for the header-compressed packet from the radio terminal UE by using the generated ROHC context. Then, the control unit 140#2 of the base station eNB#2 controls the network communication unit 120#2 to transmit a header-non-compressed packet obtained through the header decompression, to the gateway device S-GW.

(5.2) Detailed Operation Example of Source Base Station Related to Uplink

Figure 13:
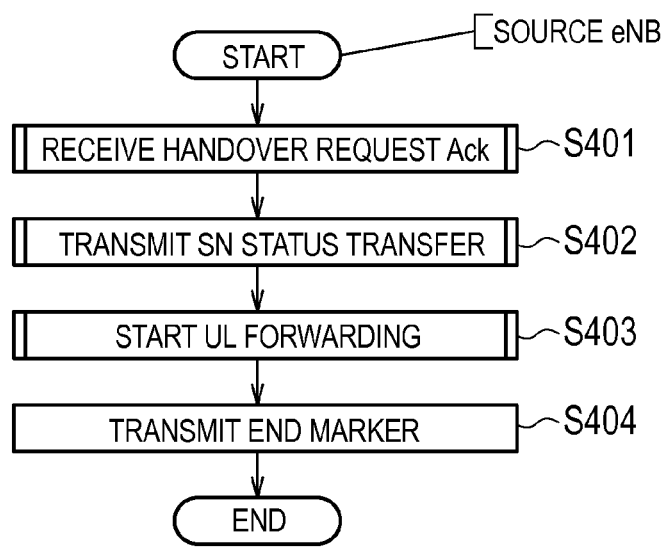
FIG. 13 is a flowchart illustrating the operation of the source base station related to the uplink according to the embodiment of the present invention.

FIG. 13 is a flowchart illustrating the operation of the source base station eNB#1 related to the uplink.

As illustrated in FIG. 13, in step S401, the network communication unit 120#1 of the base station eNB#1 receives a Handover Request Ack message (refer to step S107 in FIG. 8) from the target base station eNB#2.

In step S402, the control unit 140#1 of the base station eNB#1 controls the network communication unit 120#1 to transmit an SN Status transfer message (refer to step S111 in FIG. 8) to the target base station eNB#2.

In step S403, the control unit 140#1 of the base station eNB#1 controls the network communication unit 120#1 to forward a non-transmitted data packet (a header-non-compressed packet) of the uplink, which is buffered in the storage unit 130#1 (refer to step S112 in FIG. 8), to the target base station eNB#2.

In step S404, when the forwarding is completed, the control unit 140#1 of the base station eNB#1 controls the network communication unit 120#1 to transmit an End Marker (refer to step S122 in FIG. 8) indicating the completion of the forwarding d to the target base station eNB#2.

(5.3) Detailed Operation Example of Target Base Station Related to Uplink

Figure 14:
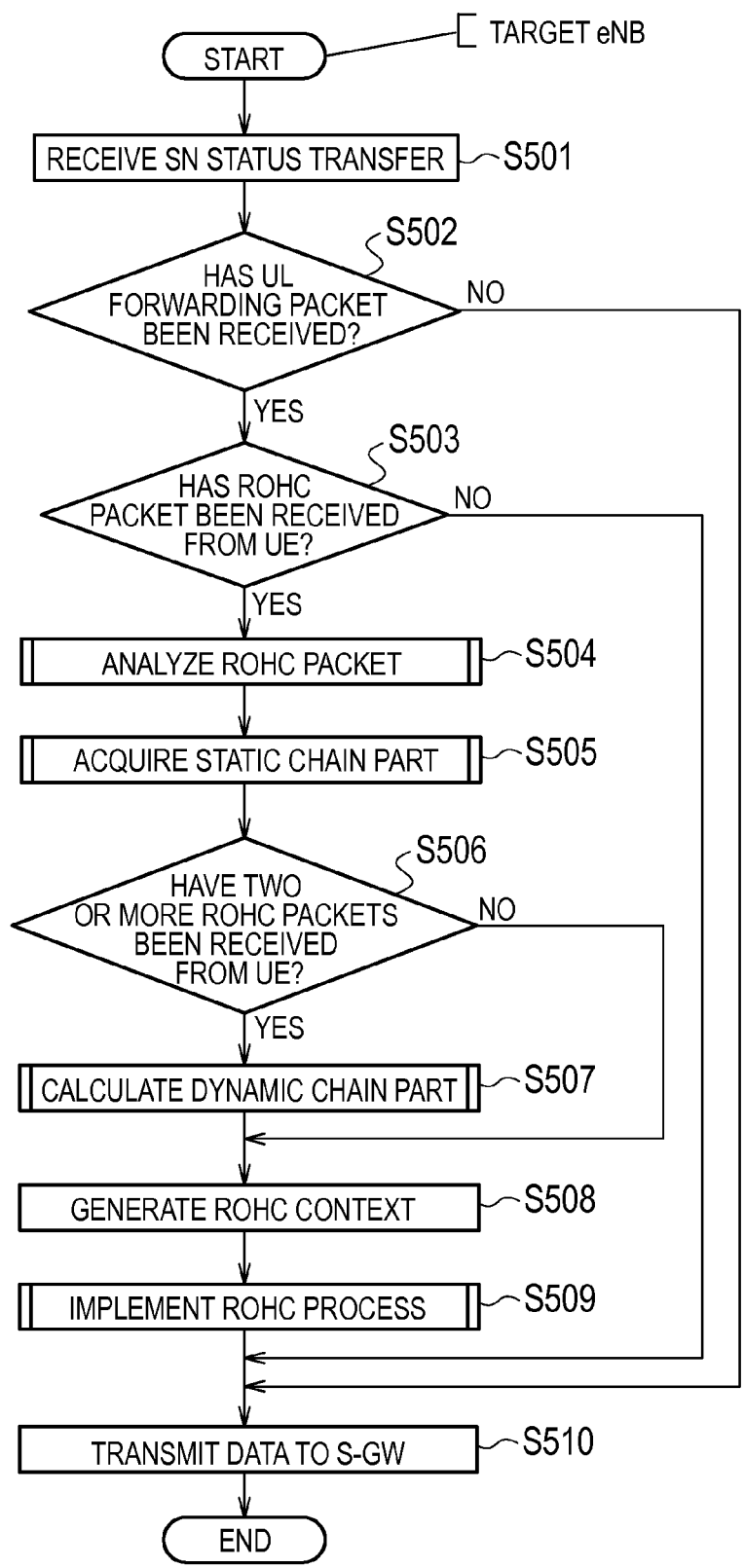
FIG. 14 is a flowchart illustrating the operation of the target base station related to the upnlink according to the embodiment of the present invention.

FIG. 14 is a flowchart illustrating the operation of the target base station eNB#2 related to the uplink.

As illustrated in FIG. 14, in step S501, the network communication unit 120#2 of the base station eNB#2 receives the SN Status transfer message (refer to step S111 in FIG. 8) from the source base station eNB#1.

In step S502, the control unit 140#2 of the base station eNB#2 confirms whether the network communication unit 120#2 has received the uplink forwarding packet (the header-non-compressed packet). When the network communication unit 120#2 receives the uplink forwarding packet (step S502: YES), the control unit 140#2 of the base station eNB#2 proceeds to a process in step S503.

In step S503, the control unit 140#2 of the base station eNB#2 confirms whether the radio communication unit 110#2 has received the header-compressed packet (refer to step S115 in FIG. 8) from the radio terminal UE. When the radio communication unit 110#2 has received the header-compressed packet from the radio terminal UE (step S503: YES), the control unit 140#2 of the base station eNB#2 proceeds to a process in step S504.

In step S504, the control unit 140#2 of the base station eNB#2 analyzes the header-compressed packet from the radio terminal UE so as to designate the header compression level of the header-compressed packet. For example, by performing matching with a header-compression pattern (a header-omission pattern) for each header compression level stored in advance in the storage unit 130#2 of the base station eNB#2, the header compression level of the header-compressed packet from the radio terminal UE is designated. Alternatively, a difference between the header-compressed packet from the radio terminal UE and the header-non-compressed packet that acts as the forwarding packet is evaluated, and on the basis of the difference, the header compression level of the header-compressed packet as the forwarding packet may be designated.

In step S505, the control unit 140#2 of the base station eNB#2 acquires each parameter (Static chain) of a packet header field that should be classified as the fixed value from one header-non-compressed packet gate as the forwarding packet on the basis of the header compression level designated in step S504. Step S505 corresponds to a first acquisition step. The acquired Static chain configures at least a part of the ROHC context.

In step S506, the control unit 140#2 of the base station eNB#2 confirms whether the network communication unit 120#2 has received two or more header-non-compressed packets, as forwarding packets. When the network communication unit 120#2 has not received two or more header-non-compressed packets, as forwarding packets (step S506: NO), the control unit 140#2 of the base station eNB#2 proceeds to a process in step S508. Meanwhile, when the network communication unit 120#2 has received two or more header-non-compressed packets, as forwarding packets (step S506: YES), the control unit 140#2 of the base station eNB#2 proceeds to a process in step S507.

In step S507, on the basis of the header compression level designated in step S504, the control unit 140#2 of the base station eNB#2 acquires a value (Dynamic chain) used for calculating each parameter of a packet header field that should be classified as the value having regularity, by using a plurality of header-non-compressed packets that have been received from the gateway device S-GW and addressed to the radio terminal UE. Step S507 corresponds to a second acquisition step. The acquired Dynamic chain configures a part of the ROHC context. Furthermore, when the header compression level designated in step S504 is low, step S507 may be omitted.

When the ROHC context is generated in this way (step S508), the control unit 140#2 of the base station eNB#2 controls the storage unit 130#2 to store the generated ROHC context.

In step S509, the control unit 140#2 of the base station eNB#2 performs header decompression for the header-compressed packet, which the radio communication unit 110#2 has received from the radio terminal UE, by using the stored ROHC context.

In step S510, the control unit 140#2 of the base station eNB#2 controls the network communication unit 120#2 to transmit the header-non-compressed packet obtained in step S509, to the gateway device S-GW.

(6) Effect of Embodiment

As described above, according to the present embodiment, at the time of a handover procedure, by using a header-compressed packet from the source base station eNB#1 and a header-non-compressed packet from the core network EPC, the target base station eNB#2 generates a ROHC context corresponding to a header compression level of the header-compressed packet. After the handover procedure is completed, by using the ROHC context generated in the handover procedure, the target base station eNB#2 performs header compression for the header-non-compressed packet received from the gateway device S-GW, and transmits a header-compressed packet obtained through the header compression to the radio terminal UE. In this way, for a downlink, it is possible to maintain the header compression level before and after the handover procedure, and to suppress an increase in an overhead after the handover procedure is completed. Moreover, downlink forwarding data is subjected to the header compression, so that it is possible to reduce an overhead of forwarding data, resulting in the reduction of the traffic on an X2 interface.

Furthermore, according to the present embodiment, at the time of the handover procedure, by using a header-non-compressed packet from the source base station eNB#1 and a header-compressed packet from the radio terminal UE, the target base station eNB#2 generates a ROHC context corresponding to a header compression level of the header-compressed packet. After the handover procedure is completed, by using the ROHC context generated in the handover procedure, the target base station eNB#2 performs header decompression for the header-compressed packet received from the radio terminal UE, and transmits a header-non-compressed packet obtained through the header decompression to the gateway device S-GW. In this way, for an uplink, it is possible to maintain the header compression level before and after the handover procedure, and to suppress an increase in an overhead after the handover procedure is completed.

Particularly, in LTE, at the time of the handover, it is prohibited to transfer the ROHC context from the source base station eNB#1 to the target base station eNB#2. However, according to the present embodiment, it is possible to suppress an increase in an overhead after the handover procedure is completed while following such a restriction of LTE.

(7) Other Embodiments

As mentioned above, the present invention has been described according to the embodiment. However, it must not be understood that the discussions and the drawings constituting a part of this disclosure limit the present invention. From this disclosure, various alternative embodiments, examples and operational techniques are apparent to those skilled in the art.

For example, the source base station eNB#1 and the radio terminal UE may confirm whether the target base station eNB#2 supports the ROHC context generation process according to the present embodiment. When the target base station eNB#2 does not support the ROHC context generation process, a general LTE handover procedure may be performed. Specifically, the source base station eNB#1 transmits a Handover Request message (refer to step S105 in FIG. 8) including information for inquiring whether ROHC context generation is possible during handover, and in response to the information, the target base station eNB#2 transmits a Handover Request Ack message (refer to step S107 in FIG. 8) including information indicating whether the ROHC context can be generated during the handover. When receiving the information indicating that the ROHC context can be generated during the handover, the source base station eNB#1 transmits, to the radio terminal UE, a handover instruction (refer to step S108 in FIG. 8) including information for holding a ROHC context used by the radio terminal UE between the radio terminal UE and the source base station eNB#1. When receiving the information for holding the ROHC context from the source base station eNB#1, the radio terminal UE performs a handover procedure while holding the ROHC context used between the radio terminal UE and the source base station eNB#1. Meanwhile, when not receiving the information for holding the ROHC context from the source base station eNB#1, the radio terminal UE discards the ROHC context used between the radio terminal UE and the source base station eNB#1, at the time of handover.

The aforementioned embodiment has described an example in which each of the source base station eNB#1 and the target base station eNB#2 is an LTE base station. However, since the 3GPP supports handover between different radio access technologies (RATs), one of the source base station eNB#1 and the target base station eNB#2 may be a RAT base station other than the LTE base station.

Furthermore, the aforementioned embodiment has described an example in which a ROHC protocol is used as a header compression technology. However, it may be sufficient to employ a header compression technology of performing header compression and decompression by using a context, and the present invention is applicable to a header compression technology other than the ROHC protocol.

As mentioned above, it must be understood that the present invention includes various embodiments and the like that are not described herein.

Note that the entire content of the Japanese Patent Application No. 2011-14586 (filed on Jan. 26, 2011) is incorporated herein by reference.

INDUSTRIAL APPLICABILITY

As mentioned above, the mobile communication method and the radio station according to the present invention are useful in radio communication, with which an increase in an overhead is suppressed after the handover procedure is completed in the mobile communication system using a header compression technology.

The invention claimed is:

1. A mobile communication method using a header compression technology, comprising:
 a step of forwarding, by a first base station, to a second base station, a header-compressed packet addressed to a radio terminal at a time of a handover procedure of the radio terminal from the first base station to the second base station;
 a step of generating, by the second base station, upon receipt of the forwarded header-compressed packet and a header-non-compressed packet addressed to the radio terminal from a core network at the time of the handover procedure, by using the header-compressed packet and the header-non-compressed packet, header-related information corresponding to a header compression level of the header-compressed packet; and
 a step of performing, by the second base station, after the handover procedure is completed, by using the generated header-related information, header compression for the header-non-compressed packet received from the core network and addressed to the radio terminal, and transmitting, to the radio terminal, a header-compressed packet obtained through the header compression.

2. The mobile communication method according to claim 1, wherein
 the step of generating the header-related information comprises:
 a step of designating a header compression level of the forwarded header-compressed packet; and
 a first acquisition step of acquiring, on the basis of the designated header compression level, each parameter of a packet header field that should be classified as a fixed value from one header-non-compressed packet received from the core network and addressed to the radio terminal, and
 the header-related information includes each of the parameters acquired in the first acquisition step.

3. The mobile communication method according to claim 2, wherein
 the step of generating the header-related information comprises:
 a second acquisition step of acquiring, on the basis of the designated header compression level, a value used for calculating each parameter of a packet header field that should be classified as a value having regularity by using a plurality of header-non-compressed packets received from the core network and addressed to the radio terminal, wherein
 the header-related information further includes the value acquired in the second acquisition step.

4. The mobile communication method according to claim 1, further comprising:
 a step of transmitting information from the first base station to the radio terminal at the time of the handover procedure, the information being used for holding header-related information used by the radio terminal between the radio terminal and the first base station;
 a step of performing, by the radio terminal, the handover procedure while holding the header-related information used between the radio terminal and the first base station, when the radio terminal receives the information from the first base station; and
 a step of performing, by the radio terminal, header decompression for the header-compressed packet received from the second base station, by using the held header-related information after the handover procedure is completed.

5. A base station in a mobile communication system using a header compression technology, comprising:
 a network communication unit that communicates with another base station and a core network;
 a radio communication unit that communicates with a radio terminal; and
 a control unit that controls the network communication unit and the radio communication unit, wherein
 the control unit performs control such that
 when the network communication unit receives a header-compressed packet addressed to the radio terminal from the other base station and a header-non-compressed packet addressed to the radio terminal from a core network, at a time of a handover procedure of the radio terminal from the other base station to the self base station, header-related information corresponding to a header compression level of the header-compressed packet is generated by using the header-compressed packet and the header-non-compressed packet, and
 after the handover procedure is completed, header compression is performed for the header-non-compressed packet received from the core network and addressed to the radio terminal by using the generated header-related information, and a header-compressed packet obtained through the header compression is transmitted from the radio communication unit to the radio terminal.

6. A mobile communication method using a header compression technology, comprising:
 a step of forwarding, by a first base station, to a second base station, a header-non-compressed packet addressed from the radio terminal to a core network, at a time of a handover procedure of a radio terminal from the first base station to the second base station;
 a step of generating, by the second base station, upon receipt of the forwarded header-non-compressed packet and a header-compressed packet from the radio terminal at the time of the handover procedure, by using the header-non-compressed packet and the header-compressed packet, header-related information corresponding to a header compression level of the header-compressed packet; and
 a step of performing, by the second base station, header decompression for the header-compressed packet received from the radio terminal by using the generated header-related information, and transmitting, to the core network, a header-non-compressed packet obtained through the header decompression after the handover procedure is completed.

7. The mobile communication method according to claim 6, wherein
 the step of generating the header-related information comprises:
 a step of designating a header compression level of the header-compressed packet from the radio terminal; and a first acquisition step of acquiring, on the basis of the designated header compression level, each parameter of a packet header field that should be classified as a fixed value from one header-non-compressed packet forwarded from the first base station, the header-related information includes each of the parameters acquired in the first acquisition step.

8. The mobile communication method according to claim 7, wherein
the step of generating the header-related information comprises:
a second acquisition step of acquiring, on the basis of the designated header compression level, a value used for calculating each parameter of a packet header field that should be classified as a value having regularity by using a plurality of header-non-compressed packets forwarded from the first base station,
the header-related information further includes the value acquired in the second acquisition step.

9. The mobile communication method according to claim 6, further comprising:
a step of transmitting information from the first base station to the radio terminal at the time of the handover procedure, the information being used for holding header-related information used by the radio terminal between the radio terminal and the first base station;
a step of performing, by the radio terminal, the handover procedure while holding the header-related information used between the radio terminal and the first base station, when the radio terminal receives the information from the first base station; and
a step of performing, by the radio terminal, header compression for a header-non-compressed packet to be transmitted to the second base station, by using the held header-related information, and transmitting a header-compressed packet obtained through the header compression to the second base station after the handover procedure is completed.

10. A base station in a mobile communication system using a header compression technology, comprising:
a network communication unit that communicates with another base station and a core network;
a radio communication unit that communicates with a radio terminal; and
a control unit that controls the network communication unit and the radio communication unit, wherein
the control unit controls such that
when the network communication unit receives, from the other base station, a header-non-compressed packet addressed from the radio terminal to a core network and the radio communication unit receives a header-compressed packet from the radio terminal, at a time of a handover procedure of the radio terminal from the other base station to the base station, header-related information corresponding to a header compression level of the header-compressed packet is generated by using the header-non-compressed packet and the header-compressed packet, and
after the handover procedure is completed, header decompression is performed for the header-compressed packet received from the radio terminal by the radio communication unit by using the generated header-related information, and a header-non-compressed packet obtained through the header decompression is transmitted from the network communication unit to the core network.

* * * * *